Figure 22:
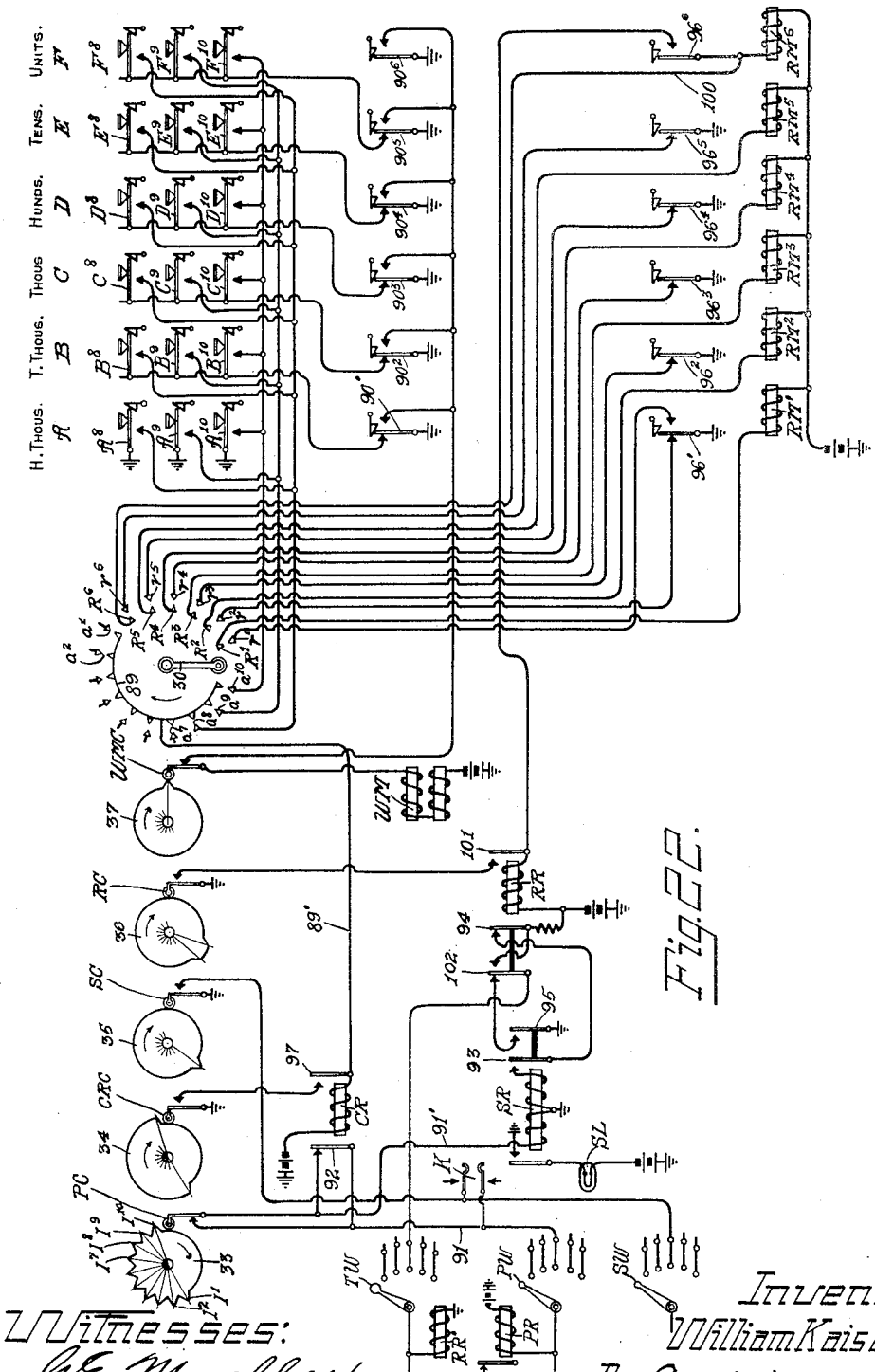

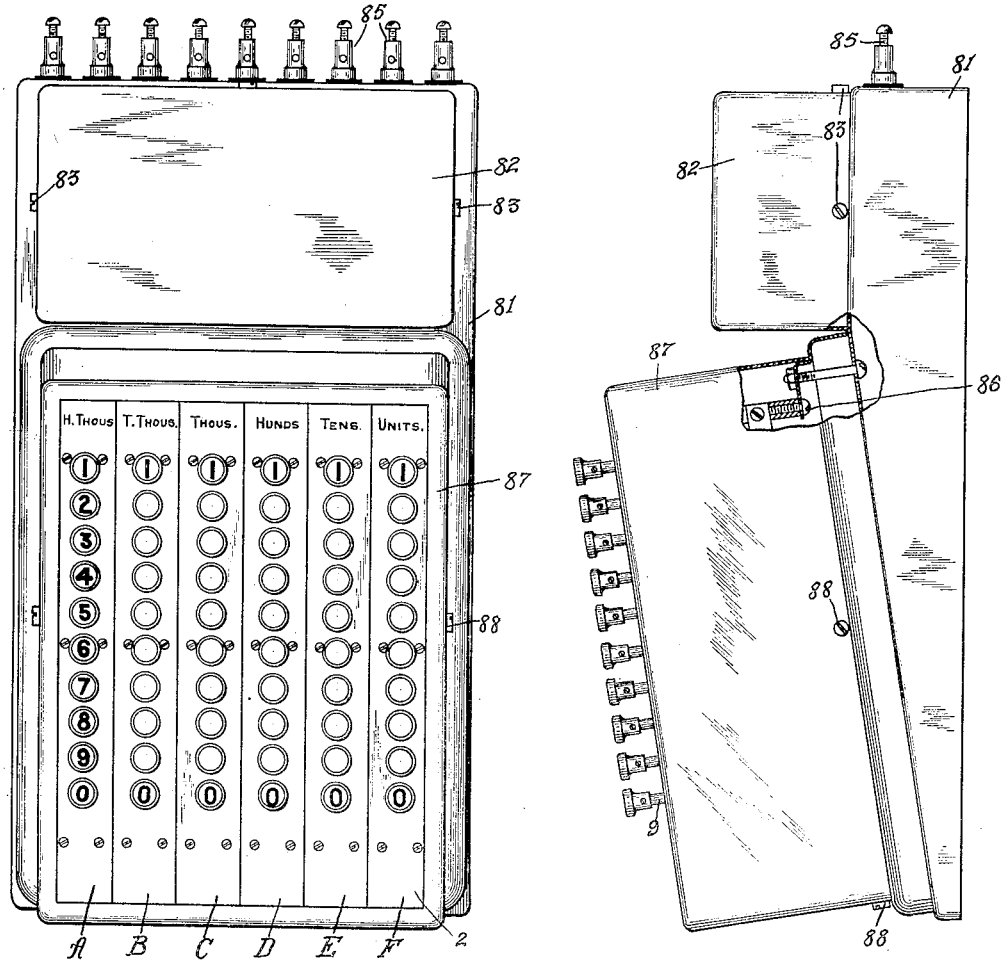

W. KAISLING.
OPERATOR'S CALLING DEVICE.
APPLICATION FILED SEPT. 19, 1912.
1,154,250.
Patented Sept. 21, 1915.
5 SHEETS—SHEET 2.
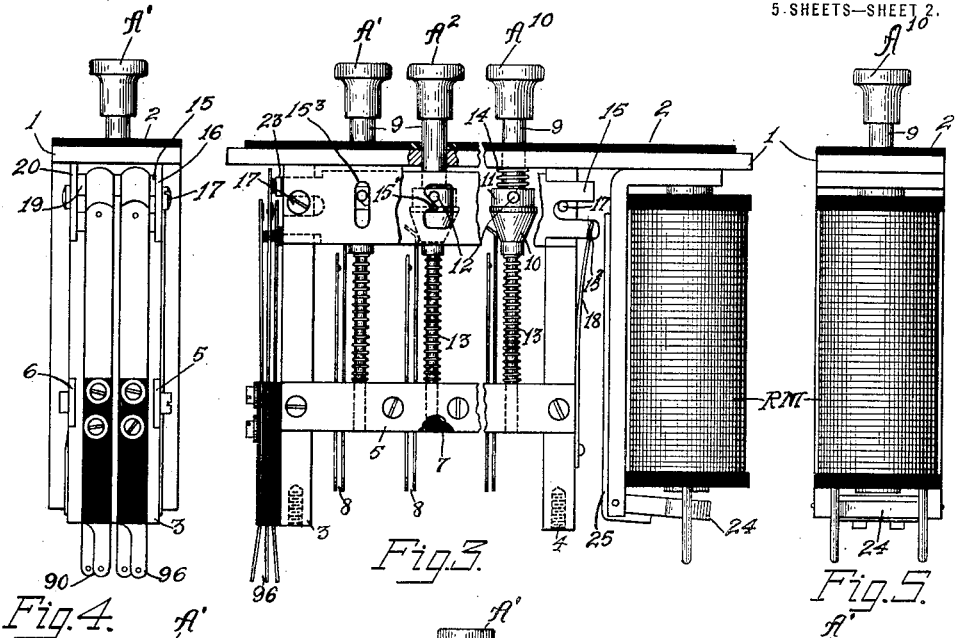
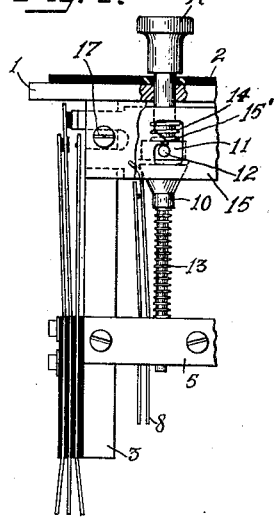
Fig. 4.
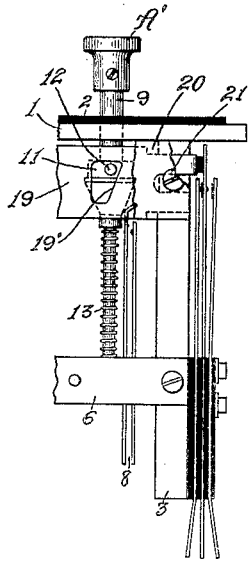
Fig. 3.
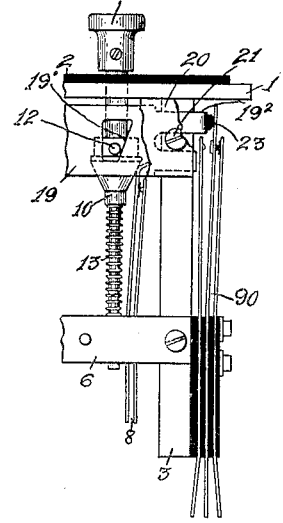
Fig. 5.
Fig. 6.    Fig. 7.    Fig. 8.
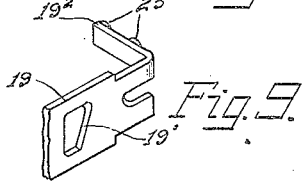
Fig. 9.
Witnesses:
G. E. Mueller
Wm. Berghahn
Inventor:
William Kaisling
By Curtis B Camp
Attorney

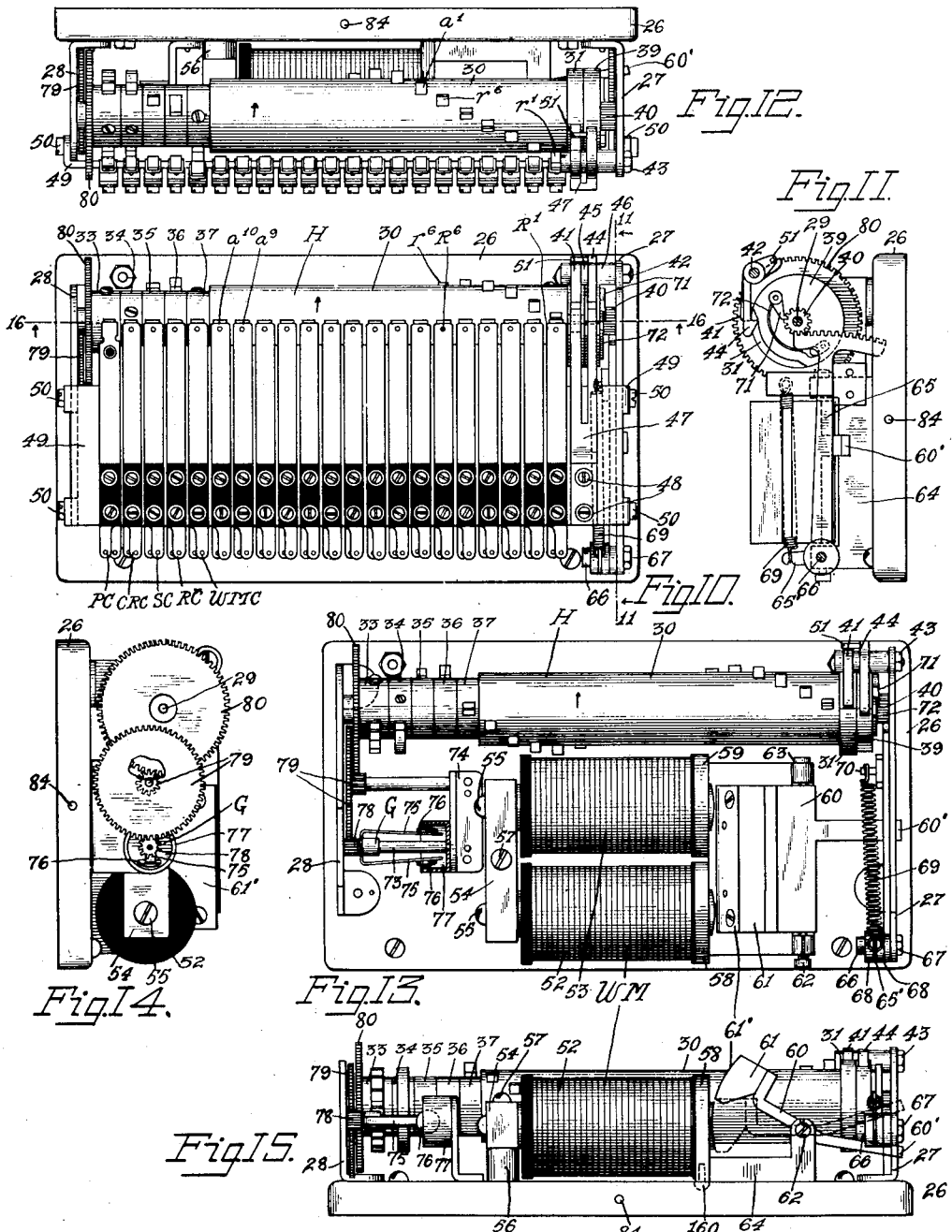

W. KAISLING.
OPERATOR'S CALLING DEVICE.
APPLICATION FILED SEPT. 19, 1912.
1,154,250.
Patented Sept. 21, 1915.
5 SHEETS—SHEET 4.
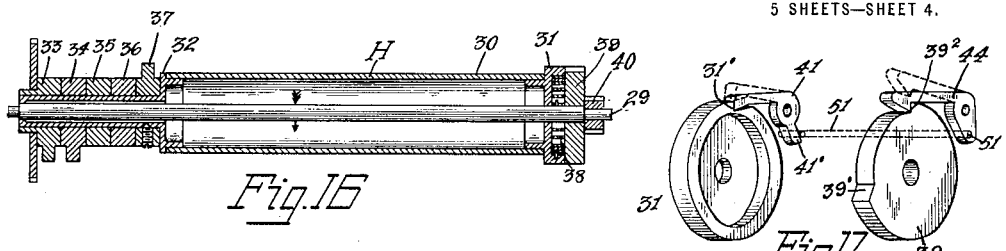
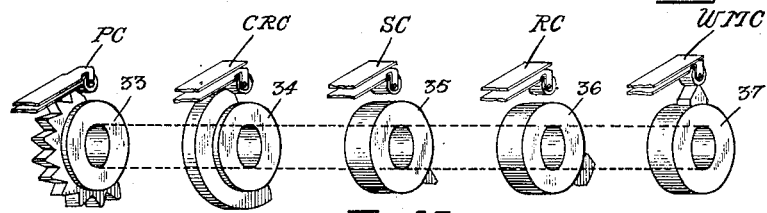
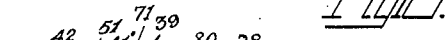
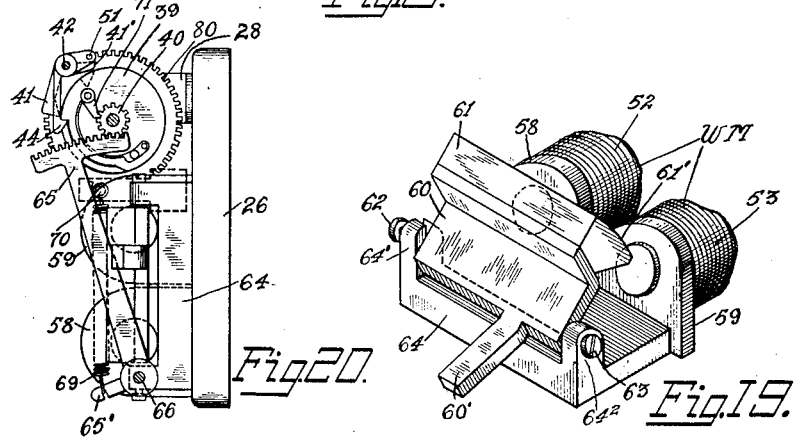
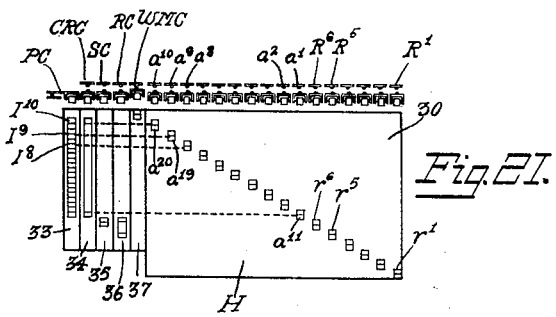
Witnesses:
G. E. Mueller
Wm. Berghahn
Inventor:
William Kaisling
By Curtis B. Camp
Attorney.

W. KAISLING.
OPERATOR'S CALLING DEVICE.
APPLICATION FILED SEPT. 19, 1912.

1,154,250.

Patented Sept. 21, 1915.
5 SHEETS—SHEET 5.

Witnesses:
G. E. Mueller
Wm Berghahn

Inventor:
William Kaisling
By Curtis B Camp
Attorney.

UNITED STATES PATENT OFFICE.

WILLIAM KAISLING, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

OPERATOR'S CALLING DEVICE.

1,154,250.   Specification of Letters Patent.   Patented Sept. 21, 1915.

Application filed September 19, 1912. Serial No. 721,170.

*To all whom it may concern:*

Be it known that I, WILLIAM KAISLING, a citizen of the United States, residing in Chicago, county of Cook, and State of Illinois, have invented new and useful Improvements in Operators' Calling Devices, of which the following is a specification.

My invention relates to impulse transmitters such as are used in connection with telephone systems employing directively controlled automatic switches, whereby a set of impulses comprising one or more series of impulses may be transmitted for effecting the operation of such automatic switches.

My invention has to do more particularly with devices of the above character employed by operators for setting up connections between different substations by the use of automatic switches. In systems of such character a great many connections are put through by an operator, so it is desirable to have a device which is easy of manipulation and quick in operation. To this end I employ series of impulse control keys in connection with impulse mechanism.

One of the features of my invention is the provision of a unitary structure comprising a base for supporting the impulse control keys and impulse mechanism, and arranged in such compact form that the device or several of them may be located at an operator's position and each one readily accessible for control by the operator.

In general, an object of my invention is to provide an impulse sender of the character described which is more simple of construction, easy of manipulation and operation and compact in form. In the ensuing description and claims I shall more particularly point out the features thereof.

For a more complete understanding of my invention, reference is to be had to the accompanying drawings in which like reference characters indicate like parts and in which—

Figure 1 is a plan view of the assembled device; Fig. 2, is a right side elevation of Fig. 1; Fig. 3, is a side elevation of the preferred form of impulse control key, and in which but three of the ten plungers employed are shown; Fig. 4, is a left end view of Fig. 3; Fig. 5, is a right end view of Fig. 3; Fig. 6, shows one of the keys or plungers in its actuated or depressed position; Fig. 7, is an opposite side view of the same plunger with a portion of the common slide bar for operating the common contacts; Fig. 8, shows the plunger or Fig. 7 in its depressed position; Fig. 9, illustrates in perspective an end of the common spring actuating slide bar; Fig. 10 is a plan view of the impulse mechanism in its normal position; Fig. 11 is a sectional view along the line 11, 11, of Fig. 10 looking in the direction of the arrow indicated thereon; Fig. 12, is a rear elevation of Fig. 10; Fig. 13 shows the impulse mechanism with the plate, carrying the sets of contact springs, removed; Fig. 14 is a left end elevation of Fig. 13 but with the gearing bracket removed to show the gearing; Fig. 15 is a front elevation of Fig. 13; Fig. 16 is a longitudinal sectional view through the cam member H along the line 16, 16, of Fig. 10 looking in the direction of the arrow indicated thereon; Fig. 17 is a dis-assembled view in perspective of the release and holding mechanism for controlling the motor spring which drives the impulse mechanism. Fig. 18 is a dis-assembled view in perspective of five of the contact spring actuating cams carried at the left of the device H of Fig. 16; Fig. 19 illustrates in perspective a portion of the winding magnet and its armature at normal. Fig. 20 shows the position of certain parts of the mechanism with the armature of the winding magnet in its actuated position; Fig. 21 is a development of the contact operating cam mechanism, and Fig. 22, is a preferred circuit arrangement or wiring diagram adapted for use in connection with the mechanism of the previous figures.

In carrying out my invention I have preferably shown a device capable of transmitting impulses representing six digits, any digit ranging in value from 1 to 10 impulses, and to this end I provide six keys A, B, C, D, E, and F, each comprising ten plungers or actuating members numbered from 1 to 0 as illustrated in Fig. 1. The keys are preferably so constructed that when any plunger is depressed, any previously actuated plunger will restore to normal.

Referring now to Figs. 3 to 9 which illustrate the preferred arrangement of the keys A, B, C, etc., a plate 1 is provided to which is suitably secured an escutcheon plate 2 preferably of an insulating material. Depending from plate 1 is a pair of posts 3, 4, to which is secured a pair of plates 5, 6 between which is clamped a strip of insulating material 7 supporting a plurality of contact springs 8, in slots, in a well known manner. Ten plunger rods 9 pass through plates 1 and 2 and alined openings in the block 7, each rod supporting an insulating buffer 10 which rests against the collar 11 secured in place on the rod 9 by means of a pin 12. A retractile spring 13 is wound around the plunger rod 9 and is adapted to restore a plunger rod when released from an actuated position. A spring 14 is wound around each plunger rod 9 to act as a shock absorber in the restoration of its plunger rod. A locking bar 15 common to the plunger rods of each key, is slidingly supported in the posts 3, 4, and held in position by a strip 16 secured at its opposite ends by screws 17. A tooth $15^1$ is provided for coöperation with the pin 12 of each plunger rod in such a manner that when a plunger is depressed to its actuated position as shown in Fig. 6, the pin 12 locks beneath the tooth $15^1$. A flat tension spring 18 rides in a slot $15^2$ at the right end of bar 15 as shown in Fig. 3, the tension of said spring being such as to tend to hold the bar 15 toward the right so that when a plunger is depressed the bar 15 is moved toward the left (Fig. 3) against the tension of spring 18, and when the plunger reaches its depressed position as shown in Fig. 6, the bar is brought back into locking position by the action of spring 18. With a plunger in its depressed position upon actuating a second plunger, the bar 15 is moved to allow the retraction of the previously actuated plunger and thereafter hold the last actuated plunger in its operated position.

Two sets of common contact springs 90 and 96 are provided for each key, and a common sliding plate 19 for operating these common springs is also provided for each key being slidably mounted in the posts 3, 4 and held in position by a plate 20 which is secured to the posts by means of screws 21.

The plate 19 is provided with a plurality of angularly disposed orifices through which project the pins 12 in such a manner that when a plunger is depressed to its actuated position as shown in Fig. 8, the pin 12 will ride against the angular surface of the orifice 19 thus moving the plate 19 toward the right (Fig. 8) whereby its projecting end $19^2$ moves the attached buffers 23 to actuate the contact sets 90 and 96. To prevent rotation of the plungers, slots $15^3$ are provided in plate 16 in which the pins 12 slide.

In the preferred embodiment of my invention I release each actuated plunger as soon as the impulses corresponding thereto have been transmitted, and to this end I employ a release magnet RM for each key which when energized attracts its armature 24 whereby the extending member 25 engages the extending end of the locking slide 15 (Fig. 3) moving said slide toward the left and releasing any plunger which is in its actuated position.

Referring now to the mechanism of Figs. 10 to 21 inclusive, it comprises a hollow sheet metal base 26 to which is suitably attached a pair of brackets 27, 28, rotatably supporting a shaft 29 which carries the spring actuating cams, or device H. Certain of these spring actuating cams are carried upon a cylinder 30 which is rigidly attached at one end to a spring barrel 31 and at its other end to a sleeve 32, said sleeve being rotatable on shaft 29. A plurality of other spring actuating cams 33, 34, 35, 36 and 37 are rigidly fastened to the sleeve 32 by means of set screws as shown so that all of the spring actuating cams supported upon the shaft 29 always maintain their same relative position. Said members 31, 32 are loose upon shaft 29, that is they are free to rotate on shaft 29 or shaft 29 is free to rotate within the members 31, 32, all as will be more clearly set forth. A driving spring 38 is carried within the spring barrel 31, one end thereof being attached to shaft 29 and the other end to barrel 31 as indicated in Fig. 16, said spring 38 being so positioned that it has a tendency to rotate the contact actuating cam device H upon shaft 29 in the direction of the arrow indicated on the barrel 30. An unlocking cam 39 is rigidly secured to shaft 29, and the pinion 40 is free to rotate on the shaft.

Member 31 which was previously referred to as a spring barrel, has a stop notch which serves as a stop for the spring motor 38, in conjunction with a stop pawl 41 which is pivotally supported upon a stud 42 which is threaded through the bracket 27 and held rigidly by means of a nut 43. A starting pawl 44, which operates in connection with the starting cam 39, is also rotatably supported upon the stud 42, the stop pawls 41, 44 being held in longitudinal position upon the stud 42 by means of collars 45, 46. A bifurcated leaf spring 47 is suitably attached by means of screws 48 to the bridge plate 49 which in turn is secured to the brackets 27, 28 by means of screws 50. The bifurcated ends of spring 47 rest upon the pawls 41, 44 in such a manner as to tend to press the teeth of the pawls against their coöperating members 31, 39 respectively. A pin 51 is secured to the tail of pawl 44 and is adapted to coöperate with the tail $41^1$ of pawl 41 in such a manner that when the tooth of pawl 44 of Fig. 17 is lifted upward into its dotted position by the rotation of cam 39, pin 51 raises pawl 41 into its dotted position whereby it is free of the tooth $31^1$ of the holding cam 31. In Fig. 17 the pin 51 is represented by dotted lines to more clearly indicate the coöperation between the pawls 41, 44.

In the preferred arrangement of my invention I have so proportioned the elements that a winding operation of motor spring 38 is effected for each revolution of the spring actuating cams, or in other words for each series of impulses in a set, and therefore a winding magnet WM is provided comprising a pair of magnet spools 52, 53 which are fastened to a yoke 54 by means of screws 55, said yoke then being secured to a stud 56 by means of the screw 57. Magnets 52, 53, are provided with metallic heads 58, 59 which are fastened to base plate 26 by means of screws 160 as shown by dotted lines in Fig. 15. An armature for magnet WM is provided comprising a plate 60 to which is attached a bar 61 rounded on its face $61^1$ to conform to the rounded surface of the ends of the cores of spools 52, 53. Plate 60 is pivotally supported by means of pivot screws 62, 63 which are threaded through upwardly extending lugs $64^1$, $64^2$ of the supporting base 64, said base being rigidly attached to the base plate 26 in any suitable manner preferably by screws passing through the surface of the base into part 64.

An arm $60^1$ extends from plate 60 and is adapted when the armature 61 is attracted, to engage the sector arm 65 and move it into its operated position as shown in Fig. 20, this movement of the sector arm being effective to rotate the pinion 40 to wind the motor spring 38. Sector arm 65 is pivotally attached to the bracket 27 by means of a stud 66 which threads through bracket 27 and is rigidly held by means of a nut 67. An arm $65^1$ and collars 68 are securely fastened to the arm 65. A restoring spring 69 is secured at one end to a stud 70 which extends from the plate 27, the other end of said spring 69 being hooked over the short arm $65^1$. This spring 69 restores the armature 61 and sector 65 each time they are operated by the winding magnet WM.

As previously stated pinion 40 is loose upon its shaft 49, and a pawl 71 is pivotally secured to the side of the starting cam 39, said pawl 71 being pressed into engagement with the teeth of pinion 40 by means of a spring 72. Thus when the winding magnet WM attracts its armature, sector arm 65 is moved from its normal position as shown in Fig. 11 to its operated position as shown in Fig. 20, thereby giving one complete revolution to pinion 40 and cam 39, in the direction of the arrow indicated thereon, this movement being effective to wind the motor spring 38. This revolution of cam 39 also causes the cam surface $39^1$ to engage the tooth of pawl 44 lifting it into the position indicated by the dotted line in Fig. 17, whereby pin 51 carried thereby engages the tail $41^1$ of pawl 41 lifting it free of the tooth $31^1$ whereby spring 38 is free to rotate the contact actuating cams. In the preferred arrangement of my invention but a momentarily energization of the winding magnet WM is effected so that when magnet WM is deënergized, the spring 69 restores sector arm 65 and armature 61, pinion 40 also being free to be rotated by this restoring movement due to the construction of the pawl 71.

The winding operation of sector arm 65 causes one complete revolution of starting cam 39 whereby pawl 44 again drops into engagement with the tooth $39^2$, so that when the spring motor has caused a complete revolution of the contact spring actuating cams and member 31, pawl 41, which has been riding upon the periphery of 31, drops into engagement with tooth $31^1$ thereby stopping further movement of the mechanism until the winding magnet WM is again energized.

To prevent the impulse mechanism from reaching an excessive speed, and in order to regulate the speed at which the impulses are transmitted, governor mechanism G is provided comprising a shaft 73 which is supported by bracket 28 and a bracket 74, said shaft having attached thereto a pair of spring arms 75 carrying friction members 76 which are adapted to engage the inner surface of a friction cup 77 which is fastened to bracket 74. A pinion 78 is also rigidly attached to shaft 73 whereby the governor G is operatively connected through the medium of a gear and pinion 79 to a gear 80, which is carried by the device H. Thus, when the device H is rotated, governor G is rotated at a relatively higher speed whereby the arms 75 are thrown outward causing the friction member 76 to act upon the friction cup 77, the adjustment of governor G being such that a desired speed of the impulse mechanism is maintained.

Having described how the mechanism whereby the contact operating cam H is driven, I will now describe more in detail the contact springs and their actuating cams.

Referring now to Fig. 10 a plurality of sets of contact springs are provided each set being insulatingly secured to the bridge plate 49. In Fig. 21, I have shown diagrammatically the arrangement of the contact springs and coöperating cams and it will be seen that contact springs PC comprise a pair of normally closed contact springs, the upper spring thereof carrying an actuating roller adapted to be engaged by the teeth $I^{10}$, $I^9$, $I^8$, etc., of member 33 each tooth I, being adapted to cause an interruption of the contact of PC. Contact spring WMC is held normally closed due to the fact that its roller normally rests upon the tooth of cam 37 as shown in Fig. 18. As the member H leaves normal position, the tooth of 37 moves away from contacts WMC causing their interruption until cam 37 again reaches normal whereby it again engages and closes the contacts WMC. All of the other contact sets are normally open and are adapted to be closed when engaged by their coöperating cams.

In the preferred arrangement of the primary impulse springs PC of my invention, 10 operations thereof are caused by each revolution of H; these operations being interruptions caused by the successive engagement of the coöperating teeth $I^{10}$, $I^9$, etc., of wheel 33, and for the purpose of controlling the number of effective operations of these impulse springs PC, a relay is provided which is controlled through the contacts $a^{10}$ $a^9$, etc., and $a^1$, these contact springs being controlled by the cam teeth $a^{20}$, $a^{19}$, etc., to $a^{11}$ respectively. The cam teeth $a^{11}$ to $a^{20}$ inclusive are so arranged upon the cylinder 30 that upon the first interruption of primary impulse contacts PC by tooth $I^{10}$, the relay control contact $a^{10}$ is operated by its tooth $a^{20}$. When the contact PC is operated for the second time contact $a^9$ is operated, etc., until the last or tenth operation of contacts PC, relay control contact $a^1$ is operated by its tooth $a^{11}$, the closure of the contacts $a^1$ to $a^{10}$ being for a period substantially the same as an interruption of the impulse contact PC. A control relay contact CRC is provided which is adapted to be held closed by its cam 34 during the 10 operations of the primary impulse contact PC. Following the operations of the primary impulse contact, the secondary impulse contact SC is operated by its cam 35 and at the same time, but for a period of two divisions, or steps, the release contact RC is operated by its cam tooth 36. All of the teeth of the cams 33 to 37 and on barrel H are laid out in equal divisions as is indicated by the dotted lines in Fig. 21. Following the operation of the last contact $a^1$, contacts $R^6$ to $R^1$ inclusive are operated in succession by their coöperating cam teeth $r^6$ to $r^1$ inclusive, respectively. Following the operation of contact $R^1$, the next step by the member H brings the cam tooth 37 into engagement with the winding magnet contact WMC whereby it is closed, to effect another operation of the winding magnet and consequently another revolution of the impulse mechanism providing the impulse keys have been operated to bring about this result as will be more clearly described.

In assembling the operating elements of my invention so as to constitute a single compact device, a hollow sheet metal base 81 is provided, on the rear portion of which is mounted the impulse mechanism over which is placed a casing 82 secured by means of screws 83 which thread into the tapped holes 84 shown in Figs. 11, 12, 14, 15. A plurality of binding posts 85 are insulatingly secured in a suitable manner to the base 81 whereby connection may be extended to said binding posts and from there to the apparatus with which it is to be connected. The keys A, B, C, etc., are secured to the base by means of screws 86 which thread into the bottom of the posts 3, 4, of the keys. A sheet metal casing 87 is then placed in position over the keys and held in place by means of screws 88.

Having described certain of the apparatus, reference will now be made to the wiring diagram or circuit arrangement of Fig. 22, which is adapted for use in connection with the apparatus previously referred to whereby the device may be caused to operate for transmitting impulses.

In Fig. 22 the parts corresponding to parts of the previous figures are indicated by like reference characters so that the circuit arrangement may be readily followed. In illustrating the keys A, B, C, D, etc., but three plungers of keys are shown, these being sufficient to illustrate the manner in which the device is operated. The key A controls the hundred thousands digit, key B the ten-thousands digit, key C the thousands digit, key D the hundreds digit, key E the tens digit and key F the units digit. The contact springs 90 and 96 shown directly beneath each of the keys A, B, C, etc. are the common contacts for the corresponding key while a release magnet RM is also shown for each key.

The impulse control contacts $a^1$, $a^2$, etc., are shown diagrammatically in Fig. 22 one of each pair of said contacts being connected in common by the conductor 89 which extends to the impulse control relay CR. In Fig. 22, for simplicity of arrangement, I have disposed the contacts which are operated by the cam teeth of barrel 30 in a circle whereby they are shown as being operated by the traveling member 30 which successively closes the contacts in the same order as is indicated in Fig. 21. Contact $a^{10}$ is connected to a plunger contact of the No. 10 or 0 plungers of each key, contact $a^9$ is connected to a No. 9 plunger contact of each key etc., until the contact $a^1$ is connected to a plunger contact of the No. 1 plungers of each key.

The winding magnet WM is connected through the winding magnet contact WMC to a normally open contact 90 on each of the keys A, B, C, etc., the number of winding operations of magnet WM being determined by the number of keys A, B, C, etc., which may be operated. Thus if a set of impulses are to be transmitted corresponding to six digits, six plungers, one in each of the six keys shown, would be operated so that six winding operations and six revolutions of the device H would result. If but three series of impulses are to be transmitted in a single set for instance, then but three plungers of the keys D, E, F would be actuated so that but three winding operations of magnet WM would be effected as will be more clearly set forth. A release relay RR is also provided for effecting the release of a selector switch which is diagrammatically represented by the three wipers TW, PW, and SW. A signal relay SR is also shown which is adapted to be energized when the associated impulse transmitter is connected with by the wipers referred to. Release relay $RR^1$ is indicated as connected to the conductor leading from test wiper TW while a primary relay PR is shown connected to the conductor leading from the primary wiper PW. The means by which the impulse transmitter is connected with is immaterial and the arrangement shown is indicated for the purpose of illustration only.

Operation: Assuming now that the wipers TW, PW and SW have connected to the contacts leading to the impulse transmitter shown, the signal relay SR is energized by current flowing from battery through primary relay PR, wiper PW, conductor 91, contact PC, conductor $91^1$ and by a multiple path through normal contact 92, through the winding of SR to ground, causing its energization whereby the signal lamp SL is lighted and relay SR held energized by current through its locking contact 93 and normal contact 94 to battery. The closing of alternate contact 95 of SR places direct ground upon the test contact to render it busy in a well known manner. The operator now actuates the listening key K and ascertains by means of an operator's telephone, the number of the wanted substation. Assuming the number of the desired line is 890,890, she depresses plungers $A^8$, $B^9$, $C^0$, $D^8$, $E^9$ and $F^0$. This closes the corresponding plunger or impulse control contacts and also the alternate contacts $90^1$, $90^2$, to $90^6$ inclusive and also operates the contact springs $96^1$, to $96^6$ inclusive. Due to the closing of alternate contacts 90, a circuit for winding magnet WM is closed whereby it attracts its armature 61, causing the arm $60^1$ to engage and move the sector arm 65 from its normal position of Fig. 11, to its operated position of Fig. 20. This operation of the sector 65, causes one complete revolution of pinion 40 thereby also effecting one complete revolution of the cam 39. Cam 39 being rigidly secured to shaft 29, the motor spring 38 is wound one revolution. As cam 39 moves through this single revolution, its cam surface $39^1$ engages and lifts the pawl 44 into the position indicated by the dotted line in Fig. 17. Pin 51 carried by pawl 44 therefore engages the tail $41^1$ of pawl 41 lifting pawl 41 free of the tooth $31^1$ whereby the spring 38 starts a revolution of device H which revolution is at a predetermined speed controlled by the adjustment of the connected governor mechanism G. Referring now to Fig. 22 as soon as member H starts its revolution, contact WMC is interrupted and magnet WM deënergizes allowing restoration of its armature 61 and sector 65 under the influence of spring 69. In the ensuing description I shall refer to the advance of member H through the distance of one tooth or division as a step. Therefore, upon the first step of member H, primary impulse contact PC is engaged and interrupted by the tooth $I^{10}$ but the circuit through conductor 91, $91^1$ is still maintained closed through the shunt contact 92. From this, it will be seen that any operations of contacts PC are not effective operations until the control relay CR has been energized to interrupt the shunt contact 92, and this energization of CR is determined by the actuated plunger. As the member 30 is advanced, nothing occurs until contact $a^8$ is reached which is the first grounded contact engaged so that when contact $a^8$ is closed a circuit for control relay CR is established traced from ground through contact $A^8$, contact $a^8$, common conductor 89, conductor $89^1$ and the winding of CR to battery. At this time impulse contact PC is open by its engagement with tooth $I^8$ so that the circuit through conductors 91, $91^1$ is interrupted thereby causing primary relay PR to deenergize to transmit the first primary impulse. For each succeeding tooth the circuit through conductors 91, $91^1$ is interrupted. There being seven more teeth $I^1$, to $I^7$, seven more interruptions of primary contacts PC are effected and thus seven more impulses are transmitted or a total of eight primary impulses corresponding to the first digit 8. Upon said energization of control relay CR its alternate contact 97 is closed and as control relay contact CRC has been closed by the cam 34, relay CR is maintained energized and shunt contact 92 interrupted until after the last operation of contact PC by the tooth $I^1$. Following the transmission of the last primary impulse, a secondary impulse is transmitted from secondary contact SC which is caused by the tooth of cam 35 which follows one step after the last primary tooth $I^1$. The simultaneous closing of contact RC has no effect upon release relay RR as said relay RR is not energized until after the last series of impulses of the set are transmitted. The continued rotation of the impulse mechanism brings tooth $r^1$ of member 30 into engagement with release contact $R^1$ whereby said contact is closed and a circuit for release magnet $RM^1$ is established, traced from battery through the winding of $RM^1$, contact $R^1$ to ground at alternate contact $96^1$. Magnet $RM^1$ is therefore energized attacting its armature 24 and extension 25 thereof engages the locking slide 15 moving it to allow restoration of the actuated plunger $A^8$ whereby contact springs $90^1$ and $96^1$ are also restored.

From the previous description it will be seen that the operating mechanism has made one complete revolution and thereby transmits impulses corresponding in value to the first digit of the called number, after which the actuated key corresponding to this first digit was restored. Upon completion of the first revolution of device H, contact WMC is again closed by its cam tooth 37 so that winding magnet WM is energized to cause another winding operation and thereby prevent stop pawl 41 from dropping into engagement with tooth $31^1$. The impulse mechanism therefore starts on another operation and member 30 advances to successively close the impulse control contacts $a^{10}$, $a^9$, etc. until it reaches the first grounded contact $a$, which in this revolution, is the contact $a^9$ which has been grounded through key $B^9$ and normal contact $90^1$. At this time primary contact PC is interrupted by engagement with tooth $I^9$, and control relay CR being energized through a circuit including the impulse control contact $a^9$, shunt contact 92 is interrupted so that the first primary impulse is transmitted. There being 8 more effective teeth upon the wheel 33, eight more interruptions and consequent primary impulses are transmitted making a total of nine impulses which represents the second digit of the called number. After the last primary impulse is transmitted, control relay CR is deënergized due to the interruption of contact CRC as before, following which a secondary impulse is transmitted by contact SC as in the last revolution of the impulse mechanism. The device H continues its revolution and nothing further occurs until contacts $R^2$ are closed by tooth $r^2$ of barrel 30 whereby a circuit for release magnet $RM^2$ is established traced from battery through the winding of $RM^2$, contacts $R^2$, $r^2$ to ground at normal contact $96^1$. Magnet $RM^2$ therefore is energized and effects the release of its key B and common contacts. The impulse mechanism now continues its advancement until contact WMC is again energized to cause another revolution of the impulse mechanism. In this third operation of the impulse mechanism, ten impulses are to be transmitted corresponding to the third digit 0 of the called number, and therefore upon the closure of contact $a^{10}$, which has been grounded through plunger $C^{10}$ and normal contact $90^2$, a circuit for control relay CR is established whereby said relay is energized to interrupt its shunt contact 92. At this time primary contact PC is interrupted due to the engagement of the first tooth $I^{10}$ and therefore the first primary impulse is transmitted followed by nine more impulses caused by the succeeding nine impulse teeth on wheel 33. Following the last primary impulse, relay CR is deënergized due to the interruption of the contact CRC, and thereafter secondary contact SC is closed to transmit a secondary impulse. The impulse mechanism now continues in its operation until contact $R^3$ is closed whereby a circuit for release magnet $RM^3$ is established traced from battery, through the winding of $RM^3$, contact $R^3$, to ground at normal contact $96^2$. Magnet $RM^3$ therefore is energized causing the restoration of its key C. As the member H reaches normal once more, winding magnet WM is again energized and therefore another operation of the impulse mechanism is effected, this being the fourth operation and being effective to transmit eight impulses corresponding to the fourth digit in the called number, represented by the actuated plunger $D^8$. This operation is the same as those previously described and it is thought it may be readily followed without a detailed description thereof. After the fourth operation of the impulse mechanism, a fifth operation is effected to transmit nine impulses corresponding in value to the fifth digit of the called number which is represented by the actuated plunger $E^9$, this operation being the same as those previously described and therefore no detailed description is thought necessary. After the fifth operation of the impulse mechanism, winding magnet WM is again energized by circuit through the remaining closed contact $90^6$, and therefore the sixth or final operation of the impulse mechanism is effected to transmit ten impulses corresponding to the last digit of the called number. The last operation of the impulse mechanism differs in the other operations in that the mechanism is brought to rest and means for transmitting a release impulse effected. Upon the starting of this last operation of the impulse mechanism contact $a^{10}$ is closed and therefore ground is connected from normal contact $90^5$ of key E, through the depressed plunger contact $F^{10}$, contact $a^{10}$, conductors 89, $89^1$ and the winding of CR to battery. Relay CR is therefore energized, and at this time primary contact PC being interrupted by tooth $I^{10}$ the first impulse is transmitted followed by nine more impulses caused by the succeeding teeth of wheel 33. Thereafter relay CR is restored followed by the transmission of a secondary impulse due to the closing of secondary contact SC as before. Simultaneously with the closure of secondary contact SC, contacts RC and $R^6$ are closed, and due to the closing of $R^6$ a circuit for release magnet $RM^6$ is established traced from battery through the winding of $RM^6$, conductor 100, contact $R^6$ to ground at normal contact 96⁵. RM⁶ therefore is energized causing the release of its key F. Upon the closing of alternate contact 96⁶ of key F, a circuit for release relay RR is established traced from battery through the winding of RR, alternate contact 96⁶, conductor 100, contact R⁶, to ground at normal contact 96⁵. Release relay RR therefore energizes closing its alternate contact 101 whereby RR is held energized by ground from contact RC. This locking circuit through contact RC is to maintain relay RR momentarily energized so that the release impulse established by the closing of its alternate contact 102 may be of a sufficient period to insure the operation of a release relay such as RR¹ which may be connected to the conductor leading from the test wiper TW. Also upon the energization of RR, its normal contact 94 is interrupted so that the signal relay SR may restore when the wiper TW leaves the engaged contact. The impulse mechanism continues to advance until it reaches normal and there being no further energizing circuit for the winding magnet WM, as all of the contact springs 90 are restored, therefore holding pawl 41 drops into the tooth 31¹ and prevents any further operation of the mechanism.

My invention is not limited to the transmission of series of impulses equal in number to the number of keys, as any set of impulses less in number than the number keys of the device may be transmitted. For instance, should it be desired to send impulses corresponding to three digits such as 890 then but three plungers are depressed, these being the plungers D⁸, E⁹, F¹⁰. Likewise other sets of impulses may be transmitted such as numbers having digits up to six in number. It is thought that from the previous description of operation, the operation when transmitting series of impulses less in number than the number of keys A, B, C, etc., will be readily understood.

Many changes and modifications will readily suggest themselves to those skilled in the art and therefore I do not desire to be limited to the exact structure as shown and described but aim to cover all that which comes within the spirit and scope of the appended claims.

What I claim as new and desire to secure by United States Letters Patent is:

1. An impulse transmitter comprising a rectangular elongated base having an angularly disposed forward portion, impulse mechanism provided with terminals supported on top the rear end of said base and a key-board including impulse control keys provided with terminals supported on said angularly disposed portion of said base, and connections extending from the terminals of the said keys to the terminals of the said impulse mechanism through the said base.

2. An impulse transmitter comprising a hollow elongated rectangular base having an angularly disposed forward end, impulse mechanism provided with terminals secured to the rear end of said base, and a key-board provided with terminals and including impulse control keys supported on top the angularly disposed portion of the base and connections extending from the terminals of said keys to the terminals of said impulse mechanism through the hollow of said base.

3. An impulse transmitter comprising impulse mechanism, impulse control keys, a spring motor for said mechanism, a winding magnet for said motor, and means for causing an operation of the winding magnet and impulse mechanism responsive to actuation of any of said keys.

4. An impulse transmitter comprising impulse mechanism, a spring motor for said mechanism, a winding magnet for said motor, impulse control keys, and means for causing operations of the winding magnet and impulse mechanism corresponding to the number of said keys actuated.

5. An impulse transmitter comprising impulse mechanism, a spring motor for said mechanism, a winding magnet for said motor, impulse control keys of different digit values, and means for causing an operation of the winding magnet and impulse mechanism responsive to actuation of any of said keys, whereby impulses are adapted to be transmitted corresponding in value to the digit value of the actuated key.

6. An impulse transmitter including rotatable impulse mechanism, a normally inoperative spring motor for driving said mechanism, a winding magnet for said motor, impulse control keys, and means for causing an operation of the winding magnet and single rotation of said impulse mechanism responsive to actuation of one of said keys.

7. An impulse transmitter comprising a rotatable device, means whereby a series of impulses may be transmitted responsive to each rotation of said device, a normally inoperative spring motor for driving said device, a winding magnet for said motor, impulse control keys, and means for causing an operation of the winding magnet and consequent single rotation of said device responsive to actuation of each one of said keys.

8. An impulse transmitter comprising a plurality of alined impulse control contacts, a plurality of corresponding impulse control keys of different digit values connected therewith, a rotatable member having cam teeth one for each of said impulse control contacts, said teeth being radially disposed about the axis of said rotatable member and adapted to successively engage and operate the corresponding contacts, impulse contacts and means for operating them a definite number of times for each revolution of said rotatable member, and means common to said impulse control contacts variably actuated according to the operated impulse key whereby the effective number of operations of said impulse contacts correspond to the digit value of the actuated key.

9. An impulse transmitter comprising impulse contacts and a rotatable coöperating member, a normally inoperative spring motor for driving said member, a winding magnet for winding said spring motor device, and means actuated responsive to the winding operation of said magnet to render said motor device operative.

10. An impulse transmitter including an elongated rectangular hollow base, impulse mechanism provided with terminals supported upon the said base, a key-board provided with terminals also supported upon the said base, and connections extending from the terminals of the said impulse mechanism to the terminals of the said key-board through the hollow in said base.

11. An impulse transmitter including a rectangular elongated hollow base having an angularly disposed forward end, an impulse transmitter mechanism, provided with electrical terminals, mounted upon the rear end of said base, a key-board, provided with electrical terminals, mounted upon the angularly disposed portion of the said base, and connections extending from the terminals of the said key-board to the terminals of the said impulse mechanism through the hollow of said base.

12. An impulse transmitter including an impulse transmitting device and a key-board device both mounted upon a rectangular hollow base, a set of terminals for said impulse device, a set of terminals for said key-board, and connections extending from the said set of terminals of the impulse device to the said set of terminals of the key-board through the hollow of the said base.

13. An impulse transmitter comprising an elongated rectangular hollow base, a key-board provided with depending terminals, an impulse mechanism controlled by a spring motor device and provided with depending terminals, means for mounting the said key-board and the said impulse mechanism upon the said base to form a unitary structure, and connections extending from the said terminals of the key-board to the said terminals of the impulse mechanism through the hollow of said base.

14. A signal transmitter comprising a key-board and an impulse mechanism mounted upon a rectangular hollow base forming a unitary structure, electrical terminals for the said key-board, electrical terminals for the said impulse mechanism, and connections extending from the said terminals of the key-board to the said terminals of the impulse mechanism through the said hollow base.

15. An impulse transmitter comprising a hollow mounting base, impulse transmitting mechanism provided with electrical terminals mounted upon the said base, a key-board provided with electrical terminals also mounted upon the same base, and connections extending from the terminals of said key-board to the terminals of said impulse transmitter through the hollow of said base.

Signed by me at Chicago, county of Cook and State of Illinois, in the presence of two witnesses.

WILLIAM KAISLING.

Witnesses:
GEORGE E. MUELLER,
B. O'BRIEN.